United States Patent [19]

Steinbatz

[11] 4,027,981
[45] June 7, 1977

[54] STORAGE CIRCUIT FOR PHOTOMETER

[75] Inventor: Alfred Steinbatz, Vienna, Austria

[73] Assignee: C. Reichert Optische Werke AG, Vienna, Austria

[22] Filed: Oct. 28, 1975

[21] Appl. No.: 626,672

[30] Foreign Application Priority Data

Oct. 14, 1974 Austria .............................. 8222/74

[52] U.S. Cl. .............................. 356/229; 356/188; 356/201; 356/204; 356/205

[51] Int. Cl.² ........................ G01J 1/10; G01J 3/45; G01N 21/06

[58] Field of Search .......... 356/229, 205, 204, 201, 356/188; 250/233

[56] References Cited

UNITED STATES PATENTS

| | | | |
|---|---|---|---|
| 3,684,378 | 8/1972 | Lord | 356/205 |
| 3,877,812 | 4/1975 | Thompson | 356/201 |
| 3,902,812 | 9/1975 | Honkawa | 356/188 |
| 3,917,957 | 11/1975 | Ansevin et al. | 356/201 |

*Primary Examiner*—John K. Corbin
*Assistant Examiner*—Stewart Levy
*Attorney, Agent, or Firm*—Alan H. Spencer; William C. Nealon; H. R. Berkenstock, Jr.

[57] ABSTRACT

An alternating light photometer, the output of which is connected over two parallel uniform current paths with both of the inputs to a differential amplifier. In each of the paths, there is included in series a resistance, a condenser, with a switch provided as well as between a switch and corresponding input of the differential amplifier, and an operational amplifier, all forming a storage circuit. The R C circuit forms a low pass with a time constant over the given engaging or disengaging time of the beam. The switches are so controlled over the switching circuit that only one of them is closed during the time of the complete release, and the other only during the time of the complete interruption of the beam to the photoelectric transducer.

7 Claims, 3 Drawing Figures

STORAGE CIRCUIT FOR PHOTOMETER

BACKGROUND OF THE INVENTION

The invention pertains to an alternating light photometer, especially a single-beam photometer, in which a beam which is periodically interrupted by means of a chopper disk rotated over a motor. The interrupted beam is incident on a photoelectric transducer, the corresponding output signal of which is amplified and conducted to a display device, in conjunction with which the chopper disk simultaneously and alternately releases an illuminting beam for one of two photosensitive elements of a switching circuit, by means of which switches creating two differential circuit paths can be alternately controlled.

A photometer of the aforementioned type is described in the German Pat. No. 2.020.387. The commutation between two current paths serves, in conventional photometers, to separately facilitate the (1) intensity of the reference beam on the one hand, and (2) the measuring beam in order to effect a relative measurement of the intensity of the measuring beam in contrast to that of the reference beam. Therefore, in conjunction with a conventional photometer, there is provided a display device for the measuring beam and a display device for the comparison beam which may be alternately controlled.

In the practice of the invention, the procedure is basically carried out in such a manner that the measuring beam is conducted to a photoelectric transducer, for instance a secondary electron amplifier, over a chopper disk for the production of differential beam-intensity. The output signal of the transducer is then composed of the so-called "dark-current signal" and a signal which is dependent on the intensity of the incident radiation. In so doing, it must be considered that the dark-current continually changes. This change of the dark-current is designated as noise.

In conjunction with constant-light photometers, the difficulty arises that the dark-current, which is temperature-sensitive, must be compensated, for which purpose a manual zero-point balance is undertaken in most cases. The result of this is, that very long setting periods are required. A greater problem than the foregoing is, however, when using digital display devices, the low-frequency noise, which is expressed in a slow fluctuation of the display. In conjunction with digital display, this can lead, for instance, to a regular change in the digit position last displayed.

In conjunction with alternating light photometers to which the one according to the invention also belongs, an alternating-voltage is amplified, as a consequence of which the direct-current portion is eliminated. Further, in such types of photometers, the influence of false light, which is incident for instance through an ocular, can be disregarded, because the false light is no longer subjected to chopping by the chopper. With the conventional alternating light photometers, what is now done is, that the alternating-current voltage output signal of the photoelectric transducer, for instance of a photomultiplier, is selectively amplified.

The known alternating light photometers, however, have a number of deficiencies. For one thing, the rotational speed of the motor serving for the drive of the chopper disk, although involving considerable expenditure and effort, does not make it feasible to maintain it sufficiently constant. The consequence of this is, that an amplifier with a proportionately large band width must be used which in turn leads to the fact that the noise signal, especially a low-frequency noise signal is, simultaneously amplified. Further, it has been shown that the long-term stability of the amplifiers customarily used is not good. The turning which is required from time to time, is complicated and expensive.

Furthermore, in conjunction with the usual photometers which function according to the alternating light method, it is required to rectify the alternating-current voltage before the display. Any rectification, however, again inevitably leads, in turn, to errors and requires a corresponding expenditure. For the elimination of the errors, it has indeed already been proposed to provide a phase-sensitive rectification in German No. 56.468. This type of rectification, however, is expensive and requires considerable effort.

SUMMARY OF THE INVENTION

Now, the invention is based on the task of creating an alternating light photometer and here, especially, a single-beam photometer of the initially mentioned type, in which the noise, and specifically, especially the low-frequency noise, is eliminated in a simple manner, that is, without appreciable construction al and circuit expenditure and effort, so that the display accuracy can be increased.

For the solution of this task, and in accordance with the invention, involving a photometer of the initially mentioned type, it is proposed that the output of the photoelectric transducer be connected over two parallel, uniform current paths with both of the inputs of a differential amplifier; that in each of both current paths there is located, in series, a resistance and a condenser with one of the switches provided as well as between switch and corresponding input of the differential amplifier, with an operational amplifier, which all together form a storage circuit, in conjunction with which the resistance and the condensor of one current path from in each case a low-pass with a time-constant lying appreciably over the given engaging or disengaging time of the beam, dependent on the rotational speed of the chopper disk; and that the switches are so controlled over the switching circuit that one of them is closed only during the time of the complete release, and the other one only during the time of the complete interruption of the beam to the photoelectric transducer.

In conjunction with the use of a connection for measurement in accordance with the invention, the high-frequency noise and likewise a noise in the chopper frequency, is deadened by the low-passes formed by resistance and condensor in both of the current paths.

In so doing, we also have the advantage that changes in the rotational speed of the chopper disk do not exert any appreciable influence on the measurement, because the time-constant of the low-pass or low-passes is selected to be correspondingly high. It is essential most of all, however that a low-frequency noise likewise be reliably eliminated, because at the inputs of the differential amplifier, voltage signals from the condensors and the operational amplifier are located which, besides the actual signal emanating from the beam, differ from each other only by such a value which corresponds to the change of the dark-signal as a consequence of the low-frequency noise, in the time in which the beam is either completely released or completely concealed. However, it is to be based on the principle that the signal changes caused by noise during this time will only be very slight. Inasmuch as, therefore, with the circuit arrangement according to the invention, we can get practically a constant signal without almost no influence by noise, at the input of the display device even over a rather long period of time, a digital display device for instance can be used with the photometer without difficulties, without any fear of a constant skip of the last digit.

In order to further raise the display accuracy, it is proposed that the photo-sensitive elements of the control circuit over the chopper disk be so illuminated, that the given connecting times of the switches on which the current paths are mounted, are shorter than the times of the complete release of interruption of the beam to the photoelectric transducer.

In order to achieve an especially neat and rapid switching, semi-conductor elements, preferably field-effect transistors are appropriately used as switches.

If, as is further provided by the invention, the low-pass resistances are variable resistances, then we are afforded the possibility of deadening any signals which are to an unusually intensive degree with noise, in individual cases, by simultaneous displacement of the resistances, specifically as the time-constant is adapted to the low-passes of the noise frequency.

Finally, it is preferable that a high-ohm operational amplifier is inserted between the photoelectric transducer and the branching point of both the current paths. The use of such an amplifier has the advantage that a relatively small current from the transducer is converted into an acceptable voltage. Such an amplifier does, in general, drift. This drifting, however, is not noticeable in conjunction with any procedure in accordance with the invention, inasmuch as the dark-signal and the bright signal, and consequently the voltage value stored in the condensors, correspondingly change and then the change is compensated for by the differential amplifier.

Further features, details and advantages of the invention are evident from the following description of a preferred exemplification, reference being made to the drawing, in conjunction with all of which, where advantages of the object of the invention may be involved for the professional man due to the status of the technology, which were not specifically pointed out, they should be reckoned as forming part of the invention, however,

DESCRIPTION OF A PREFERRED EMBODIMENT

Figure 1:
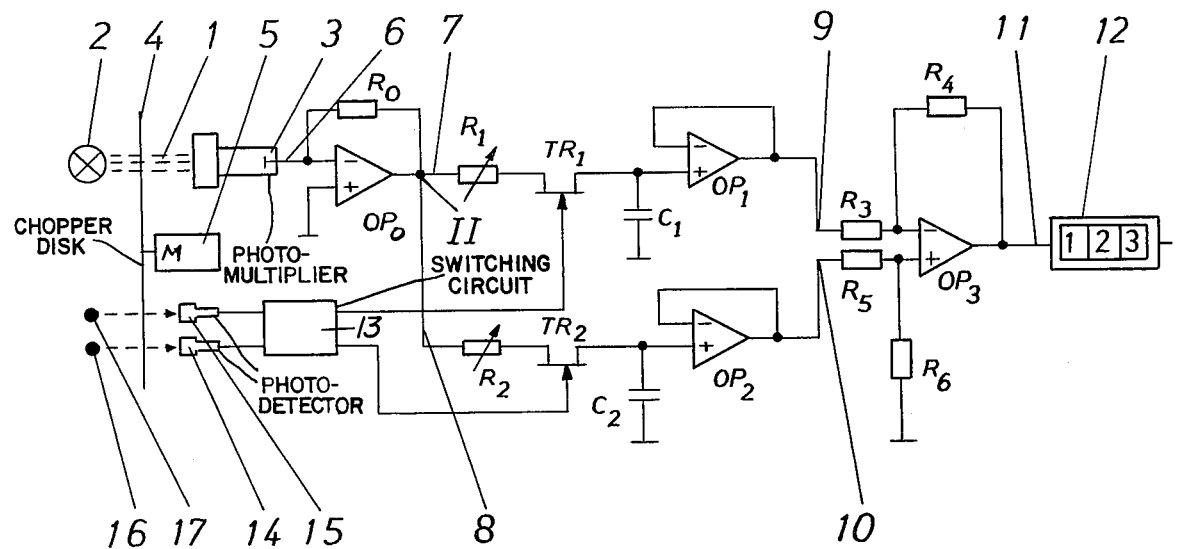
FIG. 1 is a schematic showing the construction of an alternating light/single-beam photometer according to the invention.
Figure 2:
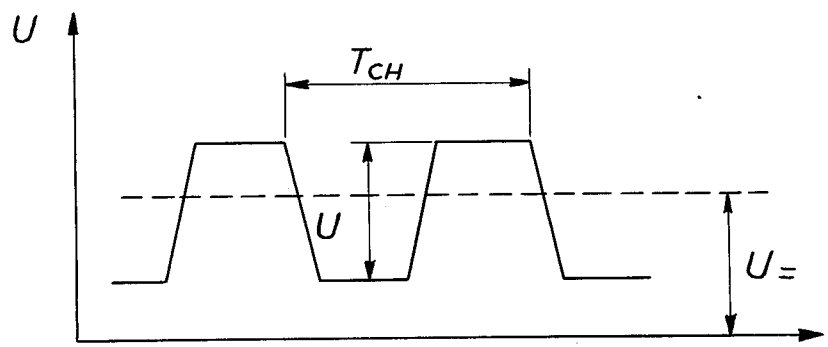
FIG. 2 illustrates the wave form of direct-current measure in point II in FIG. 1, in graphic demonstration.

In conjunction with the alternating light/single-beam photmeter shown in FIG. 1, a beam 1 of a radiational source 2, for instance a light source, is incident on a photoelectric transducer 3, in the present case a secondary electron multiplier. The beam 1 is interrupted in a known manner, by means of a chopper disk 4 periodically, which is displaced in rotation by a motor 5. The time duration of the interruption and the release of the beam 1 by the chopper disk 4 is dependent, in so doing, on the form of the notches of the chopper disk 4 and the rotational speed of the motor 5. The output current of the secondary electron multiplier 3 to the lead 6 is amplified over a high-ohm operational amplifier $OP_O$, which is fed back in the usual manner over a resistance $R_O$, and converted into a voltage signal. The voltage signal appearing in point II in FIG. 1 is in evidence in FIG. 2. It is a question of a wave direct-voltage, which consists of the direct-voltage portion U and the alternating voltage portion U. This signal, which is shown in FIG. 2, is likewise reproduced in the upper part of FIG. 3. Further details regarding the signal are further clarified below, reference being made to FIGS. 2 and 3.

At the operational amplifier $OP_O$, two parallel current paths join each other over the leads 7 and 8. Both of the current paths are in each case set up in the same uniform manner, and lead to both of the inputs 9 and 10 of a differential amplifier $OP_3$.

In the current path between the lead 7 and the input 9, a variable resistance $R_1$ is provided, with which a field-effect transistor $TR_1$ is located in series. Further, an operational amplifier $OP_1$ is switched in series to the field-effect transistor $TR_1$ and the resistance $R_1$. Finally, a resistance $R_3$ likewise lies in series, which if required can be adjustable. Between the field-effect transistor $TR_1$ and the operational amplifier $OP_1$, a condenser $C_1$ shunts off, which on the other hand is grounded.

Corresponding to the assembly of the first current path, the current path between the lead 8 and the input 10 of the differential amplifier $OP_3$ encompasses a variable resistance $R_2$, a field-effect transistor $TR_2$, a condenser $C_2$, and operational amplifier $OP_2$ and a resistance $R_5$.

At the output 11 of the differential amplifier $OP_3$, in the exemplification shown, a digital display instrument 12 is attached. The operational amplifier $OP_3$ is wired with the resistances $R_3$, $R_4$, $R_5$, $R_6$ as differential amplifiers.

The field-effect transistors $TR_1$ and $TR_2$ serve as alternatively opening and closing switches in both of the current paths. For this purpose, they are controlled over a switching circuit 13, which is known in itself, as a function of input pulses onto the switching circuit 13, which are produced by photosensitive elements 14 or as the case may be, 15. The photosensitive elements 14, 15 are illuminated by light sources 16 and 17, in conjunction with which the illuminating beam is periodically interrupted likewise, by the chopper disk 4 corresponding to its rotational speed and consequently in adaptation to the interruption of the beam 1. The interruption of the beam between the light sources 16, 17 and the photosensitive elements 14, 15 can take place, on the one hand, through the cutout, which also serve for the interruption of the beam 1. On the other hand, however, it is also possible to provide the chopper disk 4 with special interruptions or stops for this purpose, which in general are more appropriate.

Figure 3:
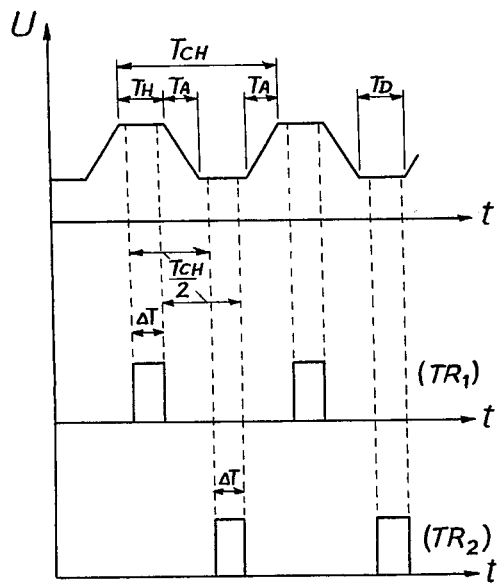
FIG. 3 illustrates the signals for the control of the switches and the times during which these signals are processed.

The method of operation of the photometer of FIG. 1 shall now be elucidated, with the assistance of FIGS. 2 and 3.

In FIG. 3, the chopper time $T_{CH}$ is indicated, in which the periodic length of the signal is involved. This chopper time $T_{CH}$ is composed of the time $T_H$, in which the beam is completely released by the chopper disk 4, hence the bright time; the time $T_D$, in which the beam 1 is completely concealed by the chopper disk (dark times) and the rise and fall times $T_A$ located between these periods (cycles) $T_H$ and $T_D$, concerning which it is to be assumed — as in most cases — they are equally long. Hence the following is valid:

$$T_{CH} = T_H + T_D + 2 \cdot T_A.$$

In FIG. 3, under the curve representing the direct-current, the control pulses are shown for both of the switches $TR_1$ (above) and $TR_2$ (below). The time duration $\Delta T$ of these pulses, as the drawing shows, is shorter than the brightness time $T_H$ or as the case may be, than the dark time $T_D$. Further, the beginning of the pulses is so situated, that the control pulses for the switch $TR_1$ are employed in each case shortly after the beginning of the bright phase (brightness time $T_H$), while the switching pulses for the field-effect transistor $TR_2$ reach the latter, in each case shortly after the beginning of the dark phase (dark time $T_D$). In this way, it is warranted that the switch $TR_1$ is opened in every case only (conducting field-effect transistor), if the beam 1 is actually fully released by the chopper disk 4. In the same manner, the field-effect transistor $TR_2$ is only conductive, if the beam 1 is completely interrupted by the chopper disk 4.

The moment at which the control pulses for the field-effect transistor $TR_1$ and $TR_2$ occur, and the length $\Delta T$ of the pulses, can be adjusted forthwith by corresponding arrangement of the switching circuit, suitable construction of the chopper disk, and appropriate positioning of the light-sources 16, 17 and photosensitive elements 14, 15.

FIG. 3 makes it possible to further recognize that the control pulses for the first field-effect transistor $TR_1$ are consecutive in the first current path, and the second field-effect transistor $TR_2$ in the second current path, in each case at an interval of a half chopper time ($T_{CH}/2$).

The following describes the manner of operation:

The voltage value of the signal (FIG. 2), which corresponds to the brightness phase, is conducted during the time in which the field-effect transistor $TR_1$ is conductive, in the first current path to the operational amplifier $OP_1$ and from there to the input 9 of the differential amplifer $OP_3$. By so doing, a damping takes place of the high-frequency noise over the low-pass $R_1 C_1$. Simultaneously, an integration is undertaken The voltage is stored at the condenser $C_1$.

At the end of the control pulse, that is, after the time $\Delta T$, and over the switching circuit 13, the field-effect transistor $TR_1$ is blocked. Inasmuch as the condenser $C_1$ and the operational amplifier $OP_1$ form a storage circuit, the voltage $C_1$, during the time now following, during which the switch $TR_1$ is open, that is, the field-effect transistor is blocked, is essentially stored. Inasmuch as the input resistance of the operational amplifer $OP_1$ is very high, the discharge of the condenser $C_1$ specifically taking place during this time is to be disregarded.

After a time $T_{CH}/2$, that is, the half chopper time, the second current path is again closed then, over the second field-effect transistor $TR_2$ during a period $\Delta T$. The same processes come into play then here, which were clarified regarding the first current path.

Inasmuch as the discharge of the condensor $C_1$ or $C_2$, as described above, is negligeable during the time in which the field-effect transistors $TR_1$ and $TR_2$ are blocking, a practically constant signal lies on the input 9 of the differential amplifier $OP_3$ during a period $T_{CH}$, which signal corresponds to the dark-signal plus the signal originating from the beam 1. In like manner, the input 10 of the differential amplifier $OP_3$ is stressed during a period $T_{CH}$, which of course is periodically shifted opposite the signal at the input 9 by $T_{CH}/2$, with a signal corresponding to the dark-value. Inasmuch as the dark signals, which are decisively controlled by the noise, practically compensate each other mutually, we get at the output 11 of the differential amplifier $OP_3$ an extensively constant signal proportionate to the signal originating from the beam 1. This signal is appropriate forthwith, in general, for the control of a digital display device 12.

In the display, in conjunction with switching according to the invention, certainly only the noise voltage is still to be perceived, to the extent of which the dark signal or also the brightness signal which are already damped with $R_1 C_1$ or $R_2 C_2$, will be changed in the time $T_{CH}/2$, inasmuch as the foregoing value at any given time was stored.

Hence, in this manner, the very troublesome low-frequency noise frequencies can be extensively eliminated. The higher-frequency noise portions are moreover damped by means of the low-passes $R_1 C_1$ or $R_2 C_2$, which are dimensioned in such a way that their time constant $T = R_1 C_1 = R_2 C_2$ is a multiple of the switching time $\Delta T$ for the field-effect transistors, in conjunction with which the time $\Delta T$ of the brightness time $T_H$ or of the dark time $T_D$ is very similar.

Preferably both of the resistances $R_1$ and $R_2$ are variable resistances. This affords the possibility, should it be so required, of damping signals heavily loaded with noise, through simultaneous adjustment of both of the resistances, as the time constant of the low-passes is being adapted to the noise frequency Reference should be made, once more, to the advantages which result by procedure according to the invention.

The amplifier $OP_0$ can be selected to be high-ohmed, so that a small current is converted into a logical voltage value. The drifting of the amplifier, which becomes noticeable only in a change of the dark-signal, is compensated for by the circuit switching.

Should false light be incident onto the cathode of the secondary electron multiplier, which is not being chopped, then this becomes noticeable only in the form of a larger direct-current portion. The consequence of this is, that the voltage on both of the condensors $C_1$ and $C_2$ is increased by the same value. Consequently, this change in the differential amplifier $OP_3$ is removed.

Also, any change of the rotational speed of the chopper motor, in the usual range, has not negative effects, inasmuch as the overall arrangement is coupled to direct-current. There is a change then, only in $\Delta T$. However, inasmuch as the time-constant T is appreciably greater than $\Delta T$, the effect is merely negligeable.

Any noise signal with the chopping frequency is likewise not amplified at the same time, but is damped corresponding to the time-constants of the low-passes.

Finally, it is further favorable that, in conjunction with the invention, the integration undertaken does not lead to the usual prolongation of the setting time. Inasmuch as the voltage on the condensors $C_1$ and $C_2$ certainly remains more or less the same, only a slight charging and discharging of the condensors must take place at any given time, which naturally can take place rapidly, as a function of the low-frequency noise occurring.

I claim:

1. In an alternating light photometer, especially a single-beam photometer, in conjunction with which a periodically interrupted beam by means of a chopper disk rotated over a motor is incident on a photoelectric transducer, the corresponding output signal of which is amplified and conducted to a display device, in conjunction with which the chopper disk simultaneously releases, alternatively, an illuminating beam for one of two photo-sensitive elements of a switching circuit, by means of which, switches governing two differential current-paths are alternately controllable, wherein the improvement comprises a storage circuit including the output (6) of the photo-electric transducer (3) is connected with both of the inputs (9, 10) of a differential amplifier ($OP_3$) over two parallel, uniform current-paths (7–9; 8–10); that in each of both of the current-paths, in series, a resistance ($R_1$, $R_2$) is located, and a condensor ($C_1$, $C_2$) in conjunction with one of the switches provided ($TR_1$, $TR_2$) as well as between switch and corresponding input of the differential amplifier, when the resistance and the condensor of a circuit-path form a low-pass ($R_1$, $C_1$; $R_2$, $C_2$) with a time-constant (T) lying appreciably over the connecting or disconnecting time of the beam (1) as determined by the rotational speed of the chopper disk (4); and that the switches over the switching circuit (13) are selectively controlled, that one of them is closed only during the time ($T_H$) of the complete release, and the other one only during the time ($T_D$) of the complete interruption of the beam to the photoelectric transducer.

2. Photometer according to claim 1, including photo-sensitive elements (14, 15) in the control circuit (13) illuminated by means of the chopper disk (4), whereby the given connection times ($\Delta T$) of the switches ($TR_1$, $TR_2$), on which the circuits-paths (7–9; 8–10) are composed, are shorter than the times of the complete release ($T_H$) or interruption ($T_D$) of the beam (1) to the photoelectric transducer (3).

3. Photometer according to claim 2, wherein said switches are composed of semiconductor elements ($TR_1$, $TR_2$).

4. Photometer according to claim 3, wherein field-effect transistor ($TR_1$, $TR_2$) serve as switches.

5. Photometer according to one claim 4, wherein said low-pass resistances are variable resistances ($R_1$, $R_2$).

6. Photometer according to claim 5, so when between the photoelectric transducer (3) and the branching point (11) of both of the current-paths (7, 8), a high-ohm operational amplifier ($OP_0$) is connected.

7. Photometer according to claim 6, including a digitally-working display device (12).

* * * * *